Patented Jan. 2, 1934

1,941,689

UNITED STATES PATENT OFFICE 1,941,689

MOTOR FUEL

Alphons O. Jaeger, Mount Lebanon, Pa., assignor to The Selden Company, Pittsburgh, Pa., a corporation of Delaware No Drawing. Application July 20, 1931
Serial No. 552,076

4 Claims. (Cl. 44—9)

This invention relates to motor fuels and more particularly to motor fuels containing unsaturated constituents, which tend to form gums such as the so-called cracked gasolines.

Cracked gasolines command a premium as motor fuels at the present time owing to their excellent antiknock qualities. However, they are open to the disadvantage that they form gum and discolor, particularly, when exposed to sunlight. It has been proposed in the past to stabilize unsaturated motor fuels and inhibit or minimize gum formation by the addition of stabilizers, among which, only two have achieved any practical success, namely, anthracene and acid amides of aromatic amines such as acetanilide.

I have found that the most effective stabilizers for unsaturated motor fuels are imides of dicarboxylic acids. The cheapest and one of the most effective imides is phthalimide, which can be obtained cheaply in beautiful white crystals from crude phthalic acid. Other imides, however, while somewhat more expensive, are highly effective and are included in the present invention. Examples of such imides are substituted phthalimides, such as amino phthalimide or N-substituted phthalimides, such as N-methyl phthalimide, N-ethyl phthalimide, N-butyl phthalimide, N-benzyl phthalimide, N-phenyl phthalimide, N-tolyl phthalmide, etc. The hydroxyalkyl N-phthalimides are also highly effective, such as N-ethanol phthalimide, N-methylol phthalimide, etc. These compounds can be easily prepared from phthalic anhydride and the corresponding amines. Imides of other acids, such as naphthalimide, succinimide, etc., are also highly effective and may be used as can their corresponding N-substituted derivatives.

The effectiveness of the imides lies probably primarily in their property of stabilizing peroxides or inhibiting their formation. Much of the gum formation in motor fuels containing unsaturated constituents lies in the oxidation of these constituents to form peroxides. A secondary source of gum formation lies in polymerization of unsaturated compounds or of aldehydes or ketones formed from them by oxidation. The imides appear to stabilize this second type of gum formation to a considerable extent and, therefore, combine properties of pure peroxide stabilizers, such as acetanilide with depolymerization catalysts such as anthacene.

The imide stabilizers of the present invention may be used in very small quantities, usually on the order of from 1 to several hundredths of a percent. In general, it is not worth while to use large quantities of an imide stabilizer as a very small amount is normally sufficient. While, therefore, in its broader aspect the invention is not limited to the use of any particular amount of stabilizer for practical purposes they are used in amounts less than one percent of the fuel.

The imide stabilizers of the present invention may be used alone or mixed with other stabilizers.

The invention will be described in greater detail in connection with the following specific examples, which set forth representative motor fuel compositions.

Example 1

1 to 3 pounds of phthalimide are mixed with 100 barrels of cracked gasoline, an excellently stabilized motor fuel results, which resists gum formation to a remarkable degree.

Example 2

1½ to 4 pounds of ethyl phthalimide or ethanol phthalimide are mixed with 100 barrels of cracked gasoline, a thoroughly stabilized motor fuel being obtained.

Example 3

1½ to 4 pounds of phenyl phthalimide are mixed with 100 barrels of cracked gasoline, resulting in a well stabilized product.

Example 4

2 to 5 pounds of naphthalimide or a mixture of 2 parts naphthalimide and 1 part phthalimide are added to 100 barrels cracked gasoline, producing a well stabilized satisfactory motor fuel.

Example 5

2-6 pounds of succinimide are added to 100 barrels of cracked gasoline, a thoroughly stabilized product being obtained.

Example 6

A mixture containing 1 pound of phthalimide and from 1 to 2 pounds of acetanilide or acetphenetidine are added to 100 barrels of cracked gasoline, resulting in a clear stabilized product.

Example 7

1-3 pounds of phthalimide and from ½ to 3 pounds of aniline or orthotoluidine are added to 100 barrels of cracked gasoline, producing a motor fuel of remarkable freedom from gum formation and from the formation of acid which is neutralized by the amine present. Acid formation may be due to improper refining or to oxidation of some of the constituents of the gasoline. Other aromatic bases may be used as an antacid, if desired.

*Example 8*

1 to 2 pounds of phthalimide are added to 100 barrels of cracked gasoline to which from 2–15% by weight of aniline is added. The resulting motor fuel is not only thoroughly stabilized completely free from acid formation but the large amount of aniline which is largely in excess of that required as an acid is a desirable anti-detonant action.

The examples describe motor fuels from cracked gasoline. The invention is, of course, applicable to motor fuels containing unsaturated constituents whatever their source.

What is claimed as new is:

1. A cracked hydrocarbon distillate containing high percentages of unsaturated compounds combined with a gum inhibitor in the form of succinimide.

2. A cracked hydrocarbon motor fuel containing succinimide in quantities sufficient to inhibit the formation of gums in said motor fuel.

3. A cracked hydrocarbon distillate having substantially the boiling range of ordinary gasoline and having added thereto a gum inhibitor in the form of a compound containing succinimide.

4. A method of stabilizing the characteristics of a cracked unsaturated hydrocarbon motor fuel distillate normally tending to deteriorate and develop gum forming constituents which comprises adding thereto, prior to such deterioration, a small proportion of succinimide sufficient to substantially inhibit further gum formation in said distillate.

ALPHONS O. JAEGER.